US009894065B2

(12) United States Patent
Suh

(10) Patent No.: US 9,894,065 B2
(45) Date of Patent: Feb. 13, 2018

(54) SECURITY MANAGEMENT METHOD AND APPARATUS FOR GROUP COMMUNICATION IN MOBILE COMMUNICATION SYSTEM

(71) Applicant: Samsung Electronics Co., Ltd., Gyeonggi-do (KR)

(72) Inventor: Kyung-Joo Suh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/432,179

(22) PCT Filed: Sep. 27, 2013

(86) PCT No.: PCT/KR2013/008689
§ 371 (c)(1),
(2) Date: Mar. 27, 2015

(87) PCT Pub. No.: WO2014/051383
PCT Pub. Date: Apr. 3, 2014

(65) Prior Publication Data
US 2015/0244720 A1    Aug. 27, 2015

(30) Foreign Application Priority Data
Sep. 27, 2012 (KR) .................. 10-2012-0108310

(51) Int. Cl.
*H04L 29/06* (2006.01)
*H04W 4/08* (2009.01)
(Continued)

(52) U.S. Cl.
CPC ........ *H04L 63/0876* (2013.01); *H04L 63/062* (2013.01); *H04L 63/065* (2013.01);
(Continued)

(58) Field of Classification Search
None
See application file for complete search history.

(56) References Cited

U.S. PATENT DOCUMENTS

| | | | |
|---|---|---|---|
| 6,587,943 B1 * | 7/2003 | Hardjono | H04L 12/1886 380/252 |
| 7,643,817 B2 | 1/2010 | Klug et al. | |

(Continued)

FOREIGN PATENT DOCUMENTS

| | | |
|---|---|---|
| CN | 101222321 A | 7/2008 |
| EP | 1944715 A2 | 7/2008 |

(Continued)

OTHER PUBLICATIONS

International Search Report dated Jan. 29, 2014 in connection with International Patent Application No. PCT/KR2013/008689, 5 pages.

(Continued)

*Primary Examiner* — Malcolm Cribbs

(57) ABSTRACT

The present invention relates to a security management method and an apparatus for group communication when a terminal interacts and communicates with a mobile communication system. The security management method for group communication performed in a server, which manages the group communication in the mobile communication system according to one embodiment of the present invention, includes the steps of: generating a session security key for session protection in the group communication, and mapping the session security key to a group identifier for identifying a specific group to which a terminal using the group communication belongs; transmitting the group identifier and the session security key to the terminal; and generating a traffic key for protecting traffic and transmitting the group identifier and the traffic key to the terminal.

22 Claims, 4 Drawing Sheets

(51) Int. Cl.
*H04W 12/04* (2009.01)
*H04W 4/00* (2009.01)

(52) U.S. Cl.
CPC ............. *H04W 4/08* (2013.01); *H04W 12/04* (2013.01); *H04W 4/005* (2013.01)

(56) References Cited

U.S. PATENT DOCUMENTS

| | | | |
|---|---|---|---|
| 8,824,427 B2 | 9/2014 | Ryu et al. | |
| 2003/0126464 A1* | 7/2003 | McDaniel | G06F 21/604 726/4 |
| 2005/0078619 A1* | 4/2005 | McClendon | H04W 4/08 370/312 |
| 2005/0187966 A1* | 8/2005 | Iino | H04L 63/065 |
| 2008/0049941 A1* | 2/2008 | Kim | H04W 12/04 380/278 |
| 2008/0165958 A1* | 7/2008 | Matsushita | G06F 21/10 380/44 |
| 2008/0253562 A1* | 10/2008 | Nyberg | H04L 9/0833 380/30 |
| 2008/0307110 A1* | 12/2008 | Wainner | H04L 63/104 709/238 |
| 2009/0193506 A1* | 7/2009 | McGrew | H04L 63/0263 726/6 |
| 2009/0235343 A1* | 9/2009 | Sheehan | G06F 21/629 726/7 |
| 2010/0056175 A1* | 3/2010 | Bachmann | H04W 8/08 455/456.1 |
| 2010/0074446 A1* | 3/2010 | Fuchs | H04L 9/0833 380/278 |
| 2011/0051912 A1* | 3/2011 | Sundaram | H04L 9/0825 379/93.02 |
| 2012/0064932 A1* | 3/2012 | Lim | H04W 4/005 455/509 |
| 2012/0076085 A1* | 3/2012 | Chou | H04W 68/00 370/329 |
| 2012/0243681 A1* | 9/2012 | Francis | H04L 9/0866 380/44 |
| 2012/0282956 A1 | 11/2012 | Kim et al. | |
| 2013/0042313 A1* | 2/2013 | Lambert | H04W 12/04 726/7 |
| 2013/0182848 A1* | 7/2013 | Sundaram | H04L 9/0833 380/277 |

FOREIGN PATENT DOCUMENTS

| | | |
|---|---|---|
| KR | 10-2007-0122560 | 12/2007 |
| KR | 10-2009-0117576 | 11/2009 |
| KR | 10-2011-0002654 | 1/2011 |
| KR | 10-2011-0093582 | 8/2011 |
| KR | 10-2011-0109961 | 10/2011 |
| KR | 10-1094466 | 12/2011 |
| KR | 10-2012-0028197 | 3/2012 |
| WO | 2006124286 A2 | 11/2006 |
| WO | WO 2012/077999 A2 | 6/2012 |
| WO | WO 2012097883 A1 * | 7/2012 ........... H04L 9/0833 |

OTHER PUBLICATIONS

Written Opinion of International Searching Authority dated Jan. 29, 2014 in connection with International Patent Application No. PCT/KR2013/008689, 7 pages.
Extended European Search Report dated May 24, 2016 in connection with European Application No. 13841406.5, 6 pages.
Communication from a foreign patent office in a foreign counterpart application, State Intellectual Property Office of the P.R.C., "The First Office Action," Application No. CN 201380050291.9, dated Oct. 18, 2017, 19 pages.

* cited by examiner

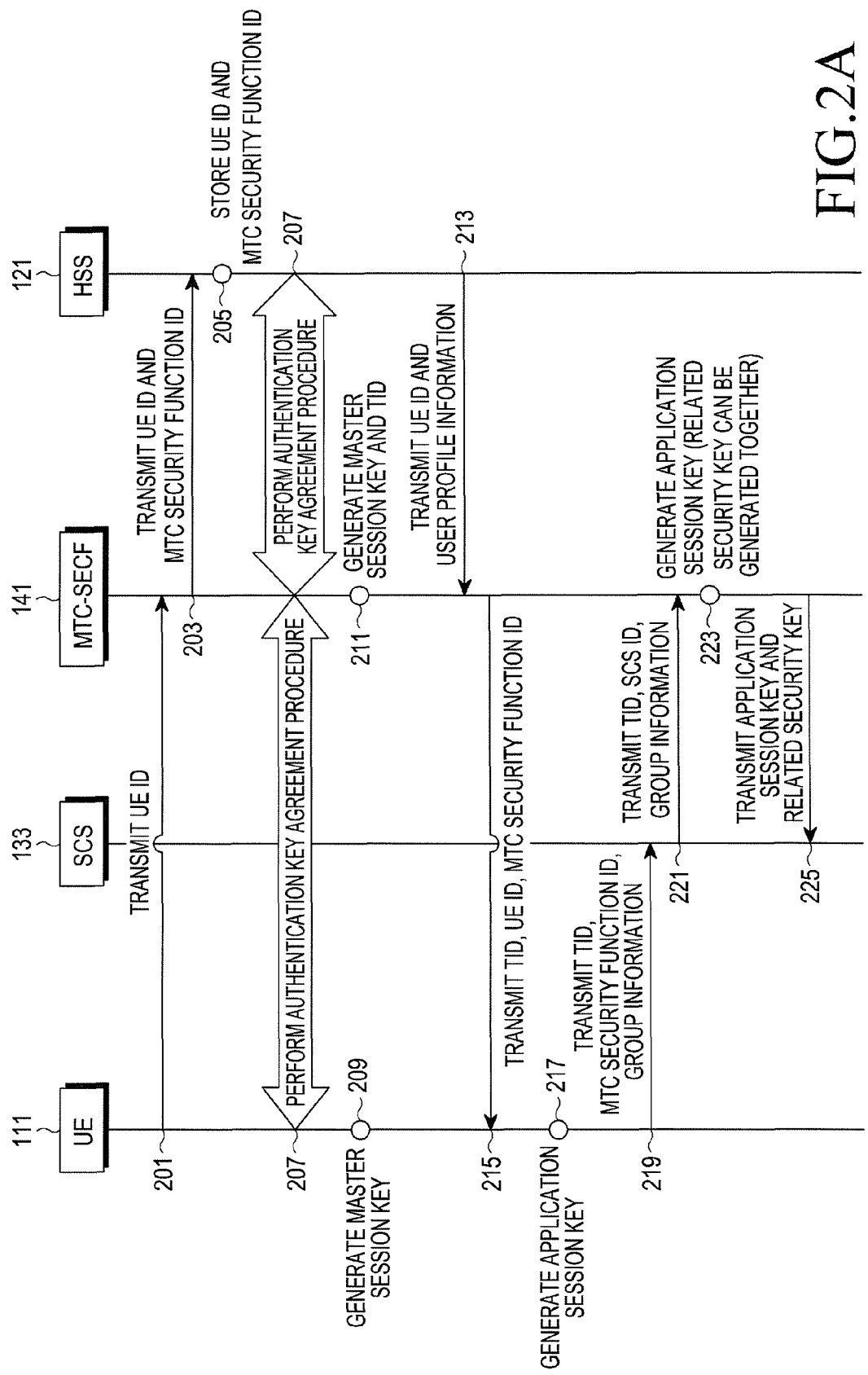

SECURITY MANAGEMENT METHOD AND APPARATUS FOR GROUP COMMUNICATION IN MOBILE COMMUNICATION SYSTEM

CROSS-REFERENCE TO RELATED APPLICATION(S)

The present application claims priority under 35 U.S.C. §365 to International Patent Application No. PCT/KR2013/008689 filed Sep. 27, 2013, entitled "SECURITY MANAGEMENT METHOD AND APPARATUS FOR GROUP COMMUNICATION IN MOBILE COMMUNICATION SYSTEM". International Patent Application No. PCT/KR2013/008689 claims priority under 35 U.S.C. §365 and/or 35 U.S.C. §119(a) to Korean Patent Application No. 10-2012-0108310 filed Sep. 27, 2012 and which are incorporated herein by reference into the present disclosure as if fully set forth herein.

TECHNICAL FIELD

The present disclosure relates to a security management method and apparatus in a mobile communication system, and more particularly, to a security management method and apparatus in group communication.

BACKGROUND ART

Generally, in a mobile communication system, communication security may be ensured in a one-to-one communication environment between one terminal and its counterpart terminal. However, in a so-called group communication environment where a plurality of terminals communicate with each other in a group, inefficient use of resources, billing problems, security vulnerabilities and the like may exist.

In the group communication environment, the security vulnerabilities may be one of the factors to inhibit the use of the group communication. Therefore, there is a need for an efficient way to stably provide security services in the group communication.

DETAILED DESCRIPTION OF THE INVENTION

Technical Subject

An aspect of an embodiment of the present disclosure is to provide an efficient security management method and apparatus for group communication in a mobile communication system.

Technical Solution

In accordance with an aspect of an embodiment of the present disclosure, there is provided a security management method for group communication performed in a server that manages group communication in a mobile communication system. The method includes generating a session security key for session protection in the group communication, and mapping the session security key to a group identity for identifying a specific group to which a User Equipment (UE) using the group communication belongs; transmitting the group identity and the session security key to the UE; and generating a traffic key for protection of traffic, and transmitting the group identity and the traffic key to the UE.

In accordance with another aspect of an embodiment of the present disclosure, there is provided a server for managing group communication in a mobile communication system. The server includes a communication interface configured to transmit and receive various information for the group communication; and a controller configured to generate a session security key for session protection in the group communication, to map the session security key to a group identity for identifying a specific group to which a User Equipment (UE) using the group communication belongs, to transmit the group identity and the session security key to the UE, to generate a traffic key for protection of traffic, and to transmit the group identity and the traffic key to the UE.

In accordance with further another aspect of an embodiment of the present disclosure, there is provided a security management method performed in a User Equipment (UE) that uses group communication in a mobile communication system. The method includes transmitting information about a specific group to which the UE using the group communication belongs, to a server that manages the group communication; receiving each of a session security key for the group communication and a traffic key for protection of traffic from the server that has received the information about the specific group; deciphering the traffic key using the received session security key; and performing the group communication through the server using the deciphered traffic key.

In accordance with yet another aspect of an embodiment of the present disclosure, there is provided a User Equipment (UE) that uses group communication in a mobile communication system. The UE includes a transceiver configured to transmit and receive various information related to the group communication; and a controller configured to transmit information about a specific group to which the UE using the group communication belongs, to a server that manages the group communication, to receive each of a session security key for the group communication and a traffic key for protection of traffic from the server that has received the information about the specific group, to decipher the traffic key using the received session security key, and to perform the group communication through the server using the deciphered traffic key.

BRIEF DESCRIPTION OF DRAWINGS

FIGS. 2A and 2B are flowcharts illustrating a security management procedure for group communication in a mobile communication system according to an embodiment of the present disclosure;

BEST MODE OF THE INVENTION

In the following description of the present disclosure, a detailed description of known functions or configurations will be omitted to avoid unnecessarily obscuring the subject matter of the present disclosure. An embodiment of the present disclosure will be described in detail below with reference to the accompanying drawings.

The operation principle according to an embodiment of the present disclosure will be described in detail below with reference to the accompanying drawings. In the following description of the present disclosure, a detailed description of known functions or configurations will be omitted to avoid unnecessarily obscuring the subject matter of the present disclosure. The terms described below are defined in consideration of the functions in the present disclosure, and these terms may vary depending on the intention of the user and the operator, or on the customs. Therefore, the definition should be made based on the contents throughout the specification.

A below-described embodiment of the present disclosure provides a security-related procedure for group communication and how to manage it by supporting the group communication in a process in which terminals communicate in a mobile communication system environment, especially in a case where a plurality of terminals or normal terminals supporting machine type communication (MTC), or smart phones exist and use wireless resources in the network. The machine type communication refers to a case where a group of MTC terminals performs downlink or uplink communication through a server, such as, for example, Device to Device (D2D) communication and Peer to Peer (P2P) communication.

For convenience, in the following description of an embodiment of the present disclosure, Evolved Packet System (EPS) system, Universal Terrestrial Radio Access Network (UTRAN) and GSM/EDGE radio access network (GERAN) based on 3rd Generation Partnership Project (3GPP) will be employed, and the present disclosure may be applied to other mobile communication systems. Obviously, in the present disclosure, various modifications may be made without departing from the scope of the present disclosure in a process of processing related information so that terminals may be suitable for the machine type communication environment or the group communication.

In addition, the present disclosure provides a method and system for securely and efficiently supporting group communication in a case where a plurality of terminals communicate with a service capability server that serves to transmit messages or data and multimedia data for a group of terminals, in a process in which terminals communicate with the network in an evolved mobile communication system including 3GPP EPS.

Figure 1:
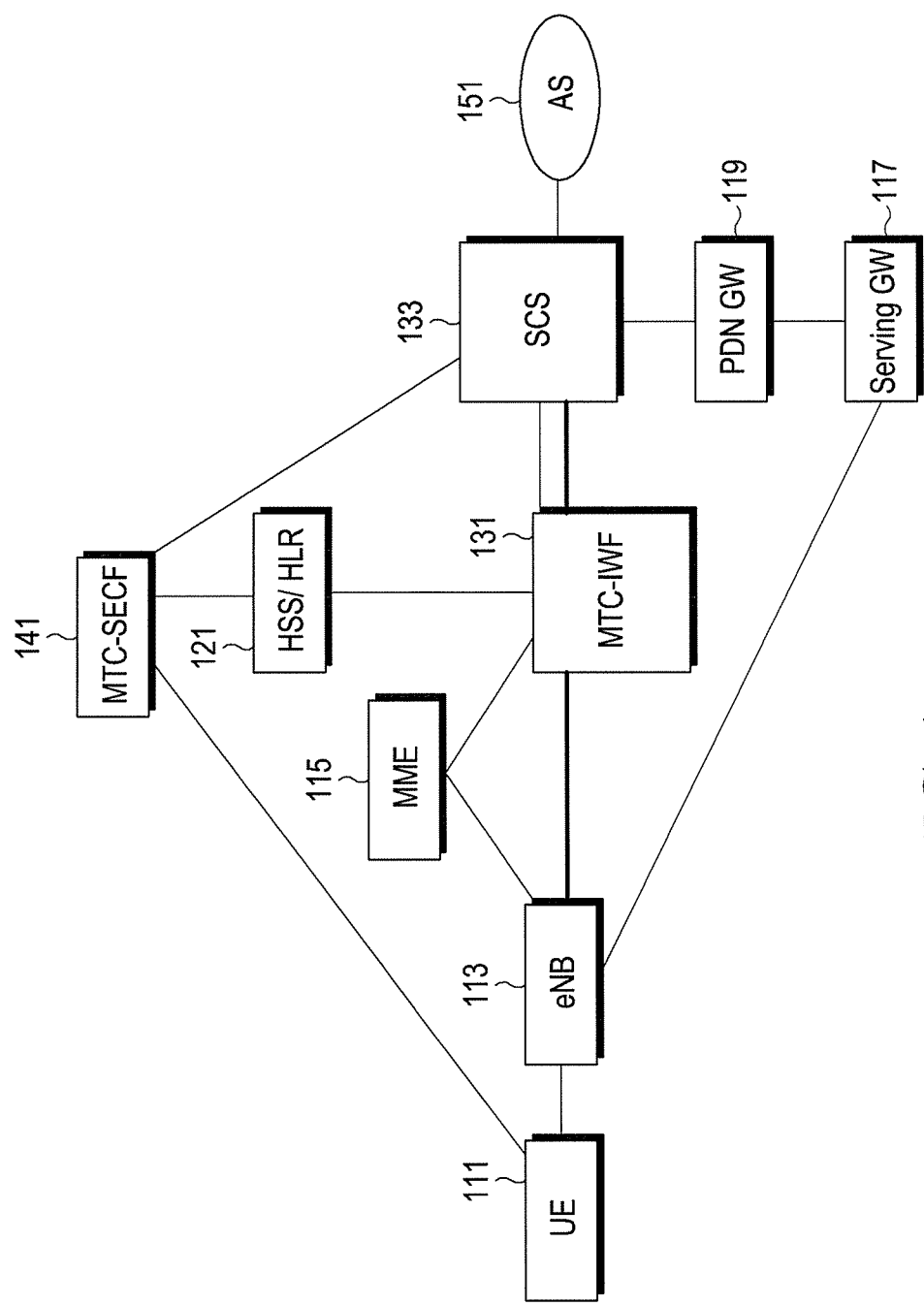
FIG. 1 is a block diagram illustrating a configuration of a mobile communication system that performs security management for group communication according to an embodiment of the present disclosure.

FIG. 1 is a block diagram illustrating a configuration of a mobile communication system that performs security management for group communication according to an embodiment of the present disclosure.

The configuration in FIG. 1 shows, for example, the structure of a 3GPP Evolved Packet System (EPS) system. An embodiment of the present disclosure will be described focusing on the 3GPP EPS system constituting an LTE system, and the security management method proposed in an embodiment of the present disclosure will be applied not only in the EPS system but also in other similar mobile communication systems.

The EPS system may include a User Equipment (UE), an Evolved Universal Terrestrial Radio Access Network (EU-TRAN), and an Evolved Packet Core (EPC).

Referring to FIG. 1, a UE 111 may set up a wireless connection with an evolved Node B (eNB) 113, and communicate with the eNB 113. The UE 111 refers to a terminal that accesses a packet data network such as the Internet over a Serving Gateway (Serving GW or S-GW) 117 and a packet data network gateway (PDN GW or P-GW) 119. In the EPS system, the EUTRAN may include a plurality of eNBs, and the EPC may include a Mobility Management Entity (MME) 115 for managing the mobility and location registration for the UE 111, the S-GW 117, and the P-GW 119. The MME 115 is in charge of a control plane for control information exchange between the UE 111 and the EPC, and the S-GW 117 and the P-GW 119 are in charge of a user plane for user data transmission. The S-GW 117 and the P-GW 119 are the network entities known in the EPS system, and a detailed description thereof will be omitted since they are not particularly related to an embodiment of the present disclosure.

The system in FIG. 1 may include a Home Subscriber Server (HSS)/Home Location Register (HLR)/Authentication Center (AUC) (hereinafter referred to as HSS) 121 that manages subscriber information such as authentication information, subscription information and service information for the user and the UE 111.

In addition, the system in FIG. 1 may include an Application Server (AS) 151 that executes an application for machine type communication, and a Service Capability Server (SCS) 133 that serves to transmit messages or data and multimedia data for a group of UEs, from the AS 151 or within the operator network.

Further, the system in FIG. 1 may include a Machine Type Communication-Interworking Function (MTC-IWF) 131 that receives a device triggering request from the SCS 133 if any, and performs data transmission and control for group communication, and may also include a Machine Type Communication-SECurity Function (MTC-SECF) 141 that performs a procedure related to the security function for group communication. Although it is shown in FIG. 1 that for convenience, the UE 111 and the MTC-SECF 141 are directly connected to each other, this is a conceptual illustration and actually, the communication between the UE 111 and the MTC-SECF 141 may be performed via the eNB 113 or an undepicted network entity.

As another example, although not shown in FIG. 1, the system may include a Bootstrapping Server Function (BSF) instead of the MTC-SECF 141, and the BSF may perform an initial procedure and a security procedure for group communication, like the MTC-SECF 141. Each of the MTC-IWF 131 and MTC-SECF 141 (or BSF) may be implemented as a server. A detailed description will now be made of a method in which the network entities such as the UE 111, the HSS 121, the eNB 113, the MME 115, the SCS 133 and the MTC-SECF 141 perform security management for group communication in an embodiment of the present disclosure.

Figure 2B:
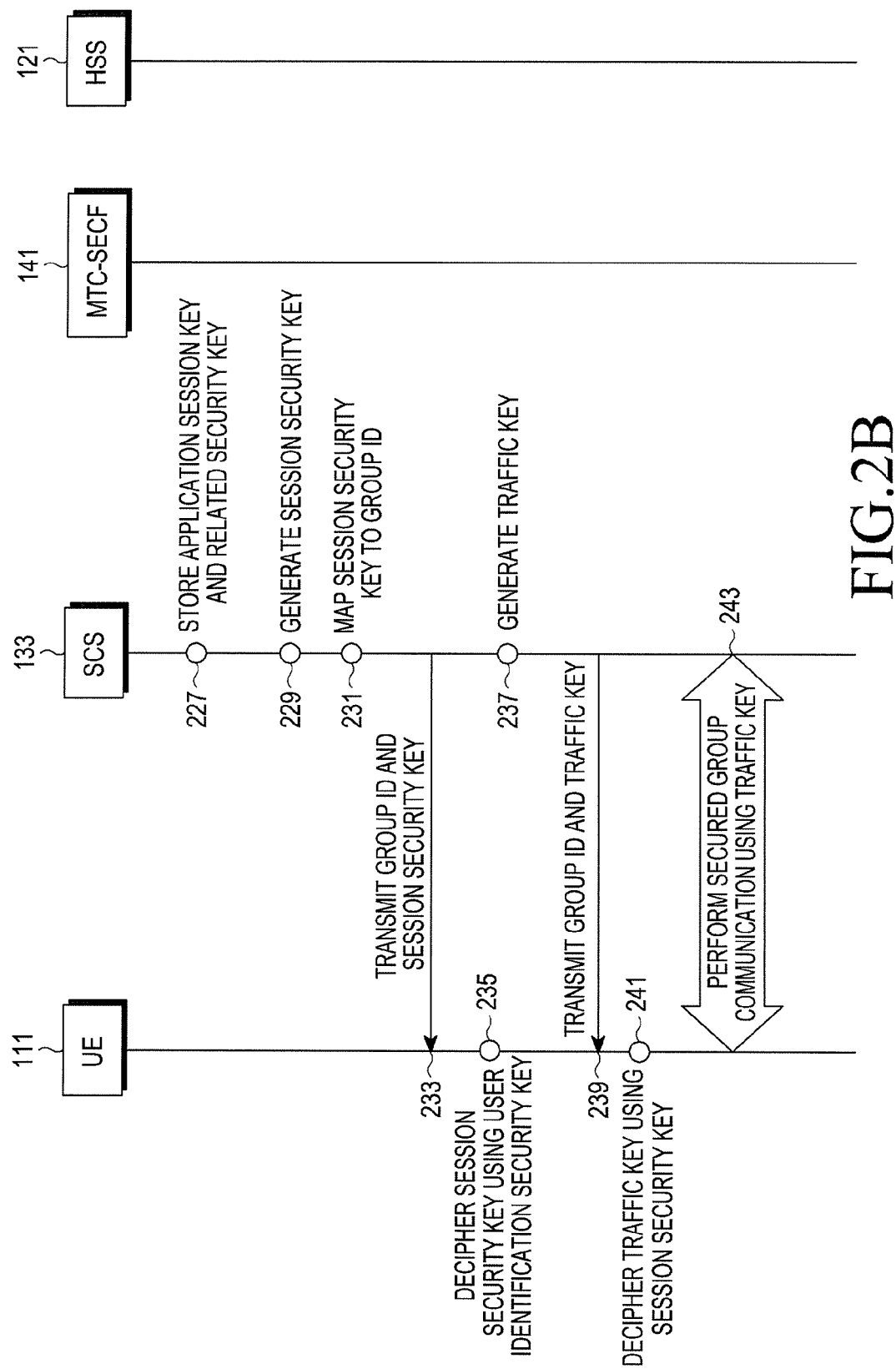

FIGS. 2A and 2B are flowcharts illustrating a security management procedure for group communication in a mobile communication system according to an embodiment of the present disclosure.

Referring to FIG. 2A, in operation 201, the UE 111 may transmit a UE identity to the MTC-SECF 141, which is a server that is responsible for a security procedure in group communication. As for the UE identity, for example, an International Mobile Subscriber Identity (IMSI) may be used, and other UE identities used in the mobile communication system may also be used. In operation 203, the MTC-SECF 141 may transmit the UE identity and a Machine Type Communication-SECurity Function-IDentity (MTC-SECF-ID, hereinafter referred to as an 'MTC security function identity') to the HSS 121. The MTC security function identity is an identity for identifying the MTC- SECF 141. Thereafter, in operation 205, the HSS 121 may store together the UE identity and the MTC security function identity received from the MTC-SECF 141. In operation 207, an Authentication Key Agreement (AKA) procedure may be performed among the UE 111, the MTC-SECF 141 and the HSS 121. The Authentication Key Agreement (AKA) procedure is a well-known procedure for performing mutual authentication between the user and the network using information about a distributed secret key that can be used between a subscriber's Universal Subscriber Identity Module (USIM) and an AUthentication Center (AuC). In the authentication key agreement procedure, a one-pass protocol for network authentication, subscriber authentication, a key establishment protocol, and a challenge/response-type protocol may be used.

After performing the authentication key agreement procedure, the UE 111 may generate a master session key (Ks) in operation 209, and the MTC-SECF 141 may generate the master session key and a Transaction Identity (TID) in operation 211. The master session key (Ks) means a master key for protecting a session. The TID is an identity that is used for data exchange and security between the UE 111 and the SCS 133 that is a server for transmitting messages or data and multimedia data in group communication of UEs. In operation 213, the HSS 121 may transmit the UE identity and user profile information to the MTC-SECF 141. As another embodiment, the operation 213 may be performed together when the HSS 121 transmits an authentication vector to the MTC-SECF 141 in the authentication key agreement procedure of operation 207. As for the authentication vector, a random number (RAND), an expected response (XRES), a ciphering key (CK), an integrity key (IK), and an authentication token (AUTN), which are generally used in the communication system, may be used for mutual authentication between the network and the UE. In operation 215, the MTC-SECF 141 may transmit the TID, the UE identity and the MTC security function identity to the UE 111, as identification information for the security in group communication.

Thereafter, in operation 217, the UE 111 may generate an application session key KS_APs using an SCS ID, a master session key and session information. The master session key is a key that is used as an input value (i.e., a seed value) for generation of the application session key, and the application session key is a key that is used as an input value (i.e., a seed value) of the following data request security key (RK) and user identification security key (UK).

Further, in operation 217, the UE 111 may generate a data request security key (e.g., Request key (RK)) for identifying the user's data request, and a user identification security key (e.g., user key (UK)) that is a security key for identifying the user. The two security keys RK and UK are provided for identifying a user and a user's request for use of an application, and in a process of generating the two security keys, the application session key Ks_APs may be used as an input value. As for the data request security key and the user identification security key, a variety of known keys for identification of data request and user identification may be used, respectively, in addition to the RK and UK.

Thereafter, in operation 219, the UE 111 may transmit the TID, the MTC security function identity and group information to the SCS 133. The group information may be a variety of information (e.g., group area or cell information) related to a group to which the user (or UE) belongs in group communication. The SCS 133 may assign, to the UE 111, a group identity for identifying the group to which the user belongs, using the group information. The group identity may be used to identify a specific group (i.e., a specific group to which a UE using the group communication belongs) to which the user belongs in group communication. As another embodiment, if the UE 111 knows the group identity, the UE 111 may transmit the group identity instead of the group information. In this case, the operation in which the SCS 133 assigns a group identity to the UE 111 may be omitted. It will be assumed in an embodiment of the present disclosure that the UE 111 transmits the group information and the SCS 133 assigns a group identity corresponding to the group information.

In operation 221, the SCS 133 may transmit the TID, an SCS identity and group information (e.g., if the SCS 133 receives a group identity from the UE 111, the SCS 133 may transmit the group identity) to the MTC-SECF 141.

Thereafter, in operation 223, the MTC-SECF 141 may generate an application session key. The MTC-SECF 141 may generate the data request security key RK and the user identification security key UK together. It will be assumed in an embodiment of the present disclosure that the data request security key RK and the user identification security key UK are also generated together. Then, in operation 225, the MTC-SECF 141 may transmit the application session key and the security keys to the SCS 133.

Referring to FIG. 2B, in operation 227, the SCS 133 may store the application session key, the data request security key RK and the user identification security key UK received from the MTC-SECF 141. In operation 229, the SCS 133 may generate a session Security Key (SK) for protecting a session. The session security key may include a Mobile Network Code (MNC) indicating the network, a Mobile Country Code (MCC) indicating the county, and information about the group to which the session security key belongs in group communication.

In operation 231, the SCS 133 may map the session security key to the group identity. Thereafter, in operation 233, the SCS 133 may transmit the group identity and the session security key to the UE 111. The session security key may be transmitted after it is ciphered using the user identification security key (e.g., UK). The session security key and the group identity may be transmitted after they are ciphered together. Otherwise, the session security key may be transmitted after it is ciphered and the group identity may be transmitted without being ciphered. If the group identity is not the group identifier that the UE 111 transmitted in operation 219, the SCS 133 may generate the session security key, and use, as the group identity, an identity that the SCS 133 assigns to the group sharing the generated session security key in group communication. In operation 235, the UE 111 may decipher the session security key using, for example, the user identification security key (e.g., UK). Thereafter, in operation 237, the SCS 133 may generate a traffic key for protection of traffic. The traffic key may include MCC, MNC, a group to which the traffic key belongs in group communication, and information about a session that uses the traffic key together, and a traffic key including at least one of the above information may be provided to the UE 111. Thereafter, in operation 239, the SCS 133 may transmit the group identity and the traffic key to the UE 111, and the traffic key may be transmitted after it is ciphered using the session security key. The traffic key and the group identity may be transmitted after they are ciphered together. Otherwise, the traffic key may be transmitted after it is ciphered and the group identity may be transmitted without being ciphered. In addition, the group identity may be separately transmitted so that it may be used for integrity check in the UE 111.

In operation 241, the UE 111 may decipher the traffic key using the session security key that was deciphered in operation 235, and in operation 243, group communication of the UE 243 through the SCS 133 may be performed as secured group communication using the traffic key.

Although an operation between one UE and the SCS 133 has been described in the example of FIGS. 2A and 2B for convenience purpose only, an embodiment of the present disclosure may be applied to, for example, multicast communication such as Multimedia Broadcast Multicast Service (MBMS) in which multiple UEs receive a service. In addition, the group communication may be applied not only to the downlink communication, but also to the uplink communication. Although not shown, as another embodiment, the session security key may be used even when the UE uses D2D communication.

Figure 3:
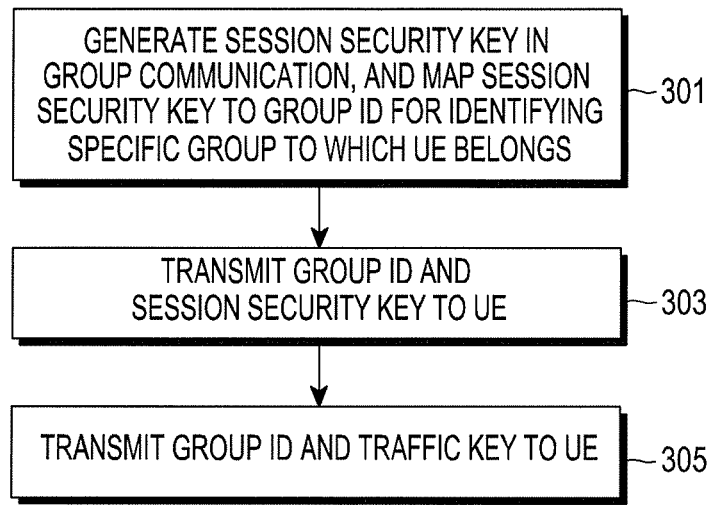
FIG. 3 is a flowchart illustrating a security management method for group communication performed in a server that manages group communication according to an embodiment of the present disclosure.

FIG. 3 is a flowchart illustrating a security management method for group communication performed in a server that manages group communication according to an embodiment of the present disclosure.

Referring to FIG. 3, in operation 301, a server that manages group communication may generate a session security key for session protection in the group communication, and map the session security key to a group identity for identifying a specific group to which a UE using the group communication belongs. The server that manages group communication may be the SCS 133. Thereafter, in operation 303, the server may transmit the group identity and the session security key to the UE. In operation 305, the server may generate a traffic key for protection of traffic and transmit the group identity and the traffic key to the UE. In an embodiment of the present disclosure, the server may receive group information for the group communication from the UE, and assign a group identity corresponding to the group information based on the received group information. Alternatively, as another embodiment, if the UE knows the group identity in advance, the server may receive the group identity from the UE.

Figure 4:
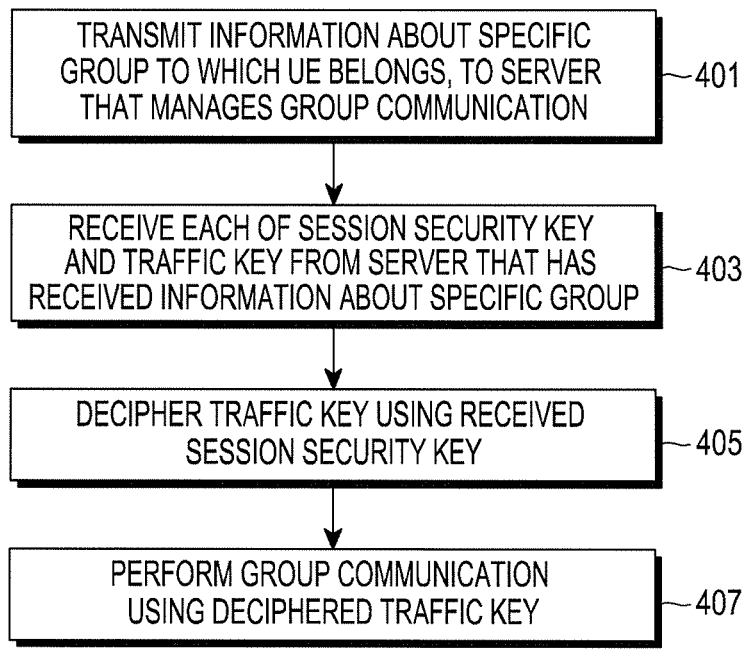
FIG. 4 is a flowchart illustrating a security management method for group communication performed in a terminal that uses group communication according to an embodiment of the present disclosure.

FIG. 4 is a flowchart illustrating a security management method for group communication performed in a terminal that uses group communication according to an embodiment of the present disclosure.

Referring to FIG. 4, in operation 401, a UE that uses the group communication may transmit information about a specific group to which the UE belongs, to a server (e.g., the SCS 133) that manages the group communication. In operation 403, the UE may receive each of a session security key for the group communication and a traffic key for protection of traffic from the server that has received the information about the specific group. The UE may decipher the traffic key using the received session security key in operation 405, and perform the group communication through the server using the deciphered traffic key in operation 407. In the example of FIG. 4, the UE may receive a group identity that is assigned based on the information about the specific group, from the server that manages the group communication.

The UE according to an embodiment of the present disclosure may include a transmitter, a receiver and a controller. The controller may perform secured group communication by transmitting and receiving a variety of information for group communication according to the method described in FIGS. 1 and 2. Each of the SCS and the MTC-SECF according to an embodiment of the present disclosure may be implemented as a server, and the SCS and the MTC-SECF may each include a controller and a communication interface that transmits and receives a variety of information for group communication to/from the UE or another server, and the controller may perform secured group communication by transmitting and receiving a variety of information for group communication according to the method described in FIGS. 1 and 2.

While specific embodiments of the present disclosure have been shown and described so far, various modifications may be made without departing from the scope of the present disclosure. Therefore, the scope of the present disclosure is not limited to the described embodiment, and should be defined not only by the appended claims but also by equivalents thereof.

The invention claimed is:

1. A security management method for group communication performed by a server in a mobile communication system, the method comprising:
   receiving a security key including a user identification security key;
   generating a session security key for session protection in a group communication;
   mapping the session security key to a group identity for identifying a specific group to which a user equipment (UE) using the group communication belongs, wherein the session security key includes information on the specific group to which the UE belongs;
   transmitting the group identity and the session security key to the UE, the session security key being ciphered using the user identification security key;
   generating a traffic key for protection of traffic, the traffic key ciphered using the session security key, wherein the traffic key includes information on the specific group to which the traffic key belongs; and
   transmitting the group identity and the traffic key to the UE,
   wherein the traffic key is deciphered by using the session security key at the UE.

2. The security management method of claim 1, further comprising:
   receiving group information for the group communication from the UE; and
   assigning the group identity corresponding to the group information.

3. The security management method of claim 2, wherein the group information includes information about at least one of an area and a cell to which the UE belongs.

4. The security management method of claim 1, further comprising receiving the group identity from the UE, conditioned upon the UE knowing the group identity.

5. The security management method of claim 1, further comprising:
   in response to receiving a machine type communication (MTC) security function identity and group information from the UE that uses MTC, transmitting the group information to another server that generates the security key related to use of an application; and
   receiving the security key related to use of the application and a session key of the application from said another server.

6. The security management method of claim 1, wherein the session security key is used for each UE during deciphering of the traffic key.

7. A server in a mobile communication system, the server comprising:
   a communication interface configured to transmit and receive data in the mobile communication system; and
   a controller configured to:

control the communication interface to receive a security key including a user identification security key;
generate a session security key for session protection in a group communication;
map the session security key for session protection to a group identity for identifying a specific group to which a user equipment (UE) using the group communication belongs, wherein the session security key includes information on the specific group to which the UE belongs;
control the communication interface to transmit the group identity and the session security key to the UE, the transmitted session security key being ciphered using the user identification security key;
generate a traffic key for protection of traffic, the traffic key ciphered using the session security key, wherein the traffic key includes information on the specific group to which the traffic key belongs; and
control the communication interface to transmit the group identity and the traffic key to the UE,
wherein the traffic key is deciphered by using the session security key at the UE.

8. A security management method by a user equipment (UE) in a mobile communication system, the method comprising:
transmitting information about a specific group to which the UE using a group communication belongs, to a server that manages a group communication;
receiving a session security key for the group communication, wherein the received session security key is ciphered using a user identification security key, wherein the session security key is mapped to a group identity for identifying a specific group to which a UE using the group communication belongs, and wherein the session security key includes information on the specific group;
receiving a traffic key for protection of traffic from the server that has received the information about the specific group, the traffic key ciphered using the session security key, wherein the traffic key includes information on the specific group to which the traffic key belongs;
deciphering the traffic key using the received session security key; and
performing the group communication through the server using the deciphered traffic key.

9. The security management method of claim 8, wherein the information about the specific group to which the UE belongs includes information about at least one of an area and a cell to which the UE belongs.

10. The security management method of claim 8, wherein the information about the specific group to which the UE belongs includes a group identity corresponding to the specific group.

11. The security management method of claim 8, wherein the receiving further comprises receiving an assigned group identity from the server based on the information about the specific group.

12. A user equipment (UE) in a mobile communication system, the UE comprises:
a transceiver configured to transmit and receive data in the mobile communication system; and
a controller configured to:
control the transceiver to transmit information about a specific group to which the UE using a group communication belongs, to a server that manages the group communication;
control the transceiver to receive a session security key for the group communication, wherein the received session security key is ciphered using a user identification security key, wherein the session security key is mapped to a group identity for identifying a specific group to which a UE using the group communication belongs, and wherein the session security key includes information on the specific group;
control the transceiver to receive a traffic key for protection of traffic from the server that has received the information about the specific group, the traffic key ciphered using the session security key, wherein the traffic key includes information on the specific group to which the traffic key belongs;
decipher the traffic key using the received session security key; and
perform the group communication through the server using the deciphered traffic key.

13. The UE of claim 12, wherein the information about the specific group to which the UE belongs includes information about at least one of an area and a cell to which the UE belongs.

14. The UE of claim 12, wherein the information about the specific group to which the UE belongs includes a group identity corresponding to the specific group.

15. The UE of claim 12, wherein the controller is configured to control the transceiver to receive, via the transceiver, an assigned group identity from the server based on the information about the specific group.

16. The server of claim 7, wherein the controller is configured to control the communication interface to receive, via the communication interface, group information for the group communication from the UE; and assign a group identity corresponding to the group information.

17. The server of claim 16, wherein the group information includes information about at least one of an area and a cell to which the UE belongs.

18. The server of claim 7, wherein the controller is configured to control the communication interface to receive, via the communication interface, the group identity from the UE, conditioned upon the UE knowing the group identity.

19. The server of claim 7, wherein the traffic key is deciphered by using the session security key at the UE, wherein the controller is configured to transmit, via the communication interface, in response to receiving a machine type communication (MTC) security function identity and a group information from the UE that uses MTC, the group information to another server that generates the security key related to use of an application; and receive, via the communication interface, the security key related to use of the application and a session key of the application from said another server.

20. The server of claim 7, wherein the session security key is used for each UE during deciphering of the traffic key.

21. The security management method of claim 1,
wherein the session security key is ciphered using a user identification security key when the session security key is transmitted to the UE, the user identification security key is generated based on an application session key, and the application session key is generated based on a master session key associated with the UE.

22. The security management method of claim 8, wherein the session security key is ciphered using a user identification security key when the session security key is transmitted to the UE, the user identification security key is generated based on an application session key, and the application session key is generated based on a master session key associated with the UE.

* * * * *